United States Patent
Bussinger (10) Patent No.: US 7,023,177 B1
(45) Date of Patent: Apr. 4, 2006

(54) RECHARGEABLE ELECTRIC BATTERY POWERED VEHICLE FOR THE PHYSICALLY CHALLENGED AND CHARGE STATION SYSTEM, AND METHODS OF MAKING AND ASSEMBLING THE SAME

(75) Inventor: Allen L. Bussinger, Saginaw, MI (US)

(73) Assignee: Amigo Mobility International, Inc., Bridgeport, MI (US)

( * ) Notice: Subject to any disclaimer, the term of this patent is extended or adjusted under 35 U.S.C. 154(b) by 216 days.

(21) Appl. No.: 10/702,756

(22) Filed: Nov. 6, 2003

Related U.S. Application Data (60) Provisional application No. 60/424,947, filed on Nov. 8, 2002.

(51) Int. Cl.
*H01M 10/44* (2006.01)
*H01M 10/46* (2006.01)

(52) U.S. Cl. ..................................... 320/109
(58) Field of Classification Search ............... 320/108, 320/109, 104
See application file for complete search history.

(56) References Cited

U.S. PATENT DOCUMENTS

| | | | |
|---|---|---|---|
| 3,273,038 A | 9/1966 | Miller | |
| 3,596,018 A * | 7/1971 | Elmes | ......................... 320/109 |
| 3,603,860 A | 9/1971 | Johnson | |
| 4,496,896 A | 1/1985 | Melocik | |
| 5,252,078 A | 10/1993 | Langenbahn | |
| 5,272,431 A * | 12/1993 | Nee | ........................... 320/109 |
| 5,462,439 A | 10/1995 | Keith | |
| 5,498,948 A * | 3/1996 | Bruni et al. | ................ 320/108 |
| 5,523,666 A * | 6/1996 | Hoelzl et al. | ............... 320/109 |
| 5,572,109 A * | 11/1996 | Keith | ......................... 320/109 |
| 5,617,003 A * | 4/1997 | Odachi et al. | ............. 320/108 |
| 5,646,500 A * | 7/1997 | Wilson | ...................... 320/108 |
| 5,654,621 A | 8/1997 | Seelig | |
| 5,710,502 A | 1/1998 | Poumey | |
| 5,821,731 A | 10/1998 | Kuki | |
| 5,850,135 A * | 12/1998 | Kuki et al. | ................. 320/108 |
| 6,087,806 A * | 7/2000 | Fujioka | ..................... 320/109 |

* cited by examiner

*Primary Examiner*—Edward H. Tso
(74) *Attorney, Agent, or Firm*—Reising, Ethington, Barnes, Kisselle & Learman, P.C.

(57) ABSTRACT

An electrically powered steerable vehicle usable by the physically challenged has at least one rechargeable battery system, a shopping basket at its front end, and a probe electrical terminal mechanism connected with said battery system and adapted to be carried forwardly on the shopping basket which is connectable with a probe receiver assembly mounting a charging station. Electrical connections are adapted to be attached between the probe receiver, charging station, and a source of electrical power. The probe receiver comprises a forwardly converging system including at least one electrically conductive, resilient, laterally expandable part adapted to be supported at the level of the probe electrical terminal mechanism.

18 Claims, 9 Drawing Sheets

RECHARGEABLE ELECTRIC BATTERY POWERED VEHICLE FOR THE PHYSICALLY CHALLENGED AND CHARGE STATION SYSTEM, AND METHODS OF MAKING AND ASSEMBLING THE SAME

This application, which claims the priority of Provisional Application Ser. No. 60/424,947 filed Nov. 8, 2002, relates particularly to battery operated shopping carts for the physically challenged and the recharging thereof in the store or other facility.

BACKGROUND OF THE INVENTION

Shopping carts of the character to be generally illustrated herein are well known and described in patents such as U.S. Pat. No. 6,273,206. Such vehicles are frequently purchased and made available in retail shopping stores and other places, which purchase them outfitted with baskets in which groceries and other articles may be conveniently carried from the shelves in the store or market to checkout counters and from the checkout counter to an automotive vehicle.

While a number of battery charge stations and large vehicle-carried charging fittings have been proposed, I am unaware that any such vehicle and charge station has achieved widespread use for the purpose of servicing small personal vehicles of the type used by the physically challenged.

SUMMARY OF THE INVENTION

The system is concerned with a battery powered steerable vehicle for the physically challenged which has a front-mounted automatic battery energizer which is visually guided and can be simply driven into position to make contact with charging elements in a charging station having expansible contact mechanism.

One of the prime objects of the present invention is to provide a vehicle charging system and method which is sufficiently economic to purchase that retail store owners will readily purchase the assembly for use in their stores.

Another object of the invention is to provide a system which is readily and safely maneuverable into charging station position and triggers automatic charging without the necessity of the physically challenged party dismounting and manipulating the vehicle to be charged.

Another object of the invention is to provide a system which is readily and safely maneuverable into charging station position and triggers automatic charging without the necessity of the physically challenged party dismounting and manipulating the vehicle to be charged.

Other objects and advantages of the invention will become apparent with reference to the accompanying drawings and the accompanying descriptive matter.

BRIEF DESCRIPTION OF THE DRAWINGS

The presently preferred embodiments of the invention are disclosed in the following description and in the accompanying drawings, wherein:

FIG. 11 is a side elevational view of a slightly modified form of shopping vehicle in charging position.

DETAILED DESCRIPTION OF THE DRAWINGS

Figure 1:
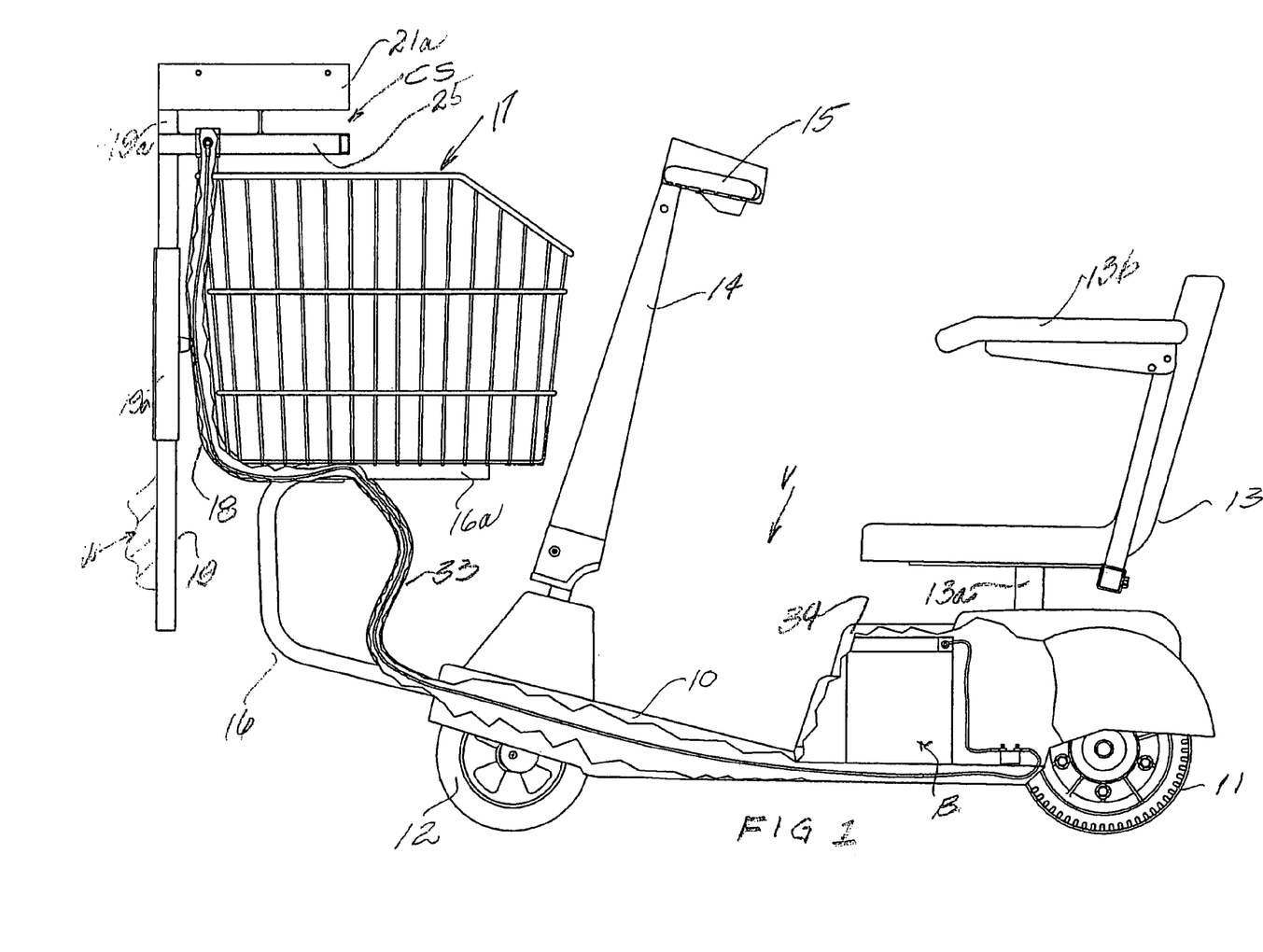
FIG. 1 is a schematic side elevational view of the docking vehicle in recharging position in the vehicle charging station.

Referring now more particularly in the first place, to FIG. 1, a typical three-wheeled vehicle V is disclosed which includes a base platform 10 supported by a pair of rear wheels 11 and a dirigible front wheel 12 in the usual manner. Normally in such vehicles, the platform 10 supports a seat 13 and a steerable tiller 14 with handlebars 15 which steer the front wheel 12. A battery system, which can comprise one or more batteries, is shown at B for driving the rear wheels 11. While a three-wheeled vehicle is shown, it should be appreciated that the front wheel 12 could be supplanted by a pair of conventionally steerable front wheels 12 without effecting the operation of the charging system which presently will be described.

Figures 5, 6:
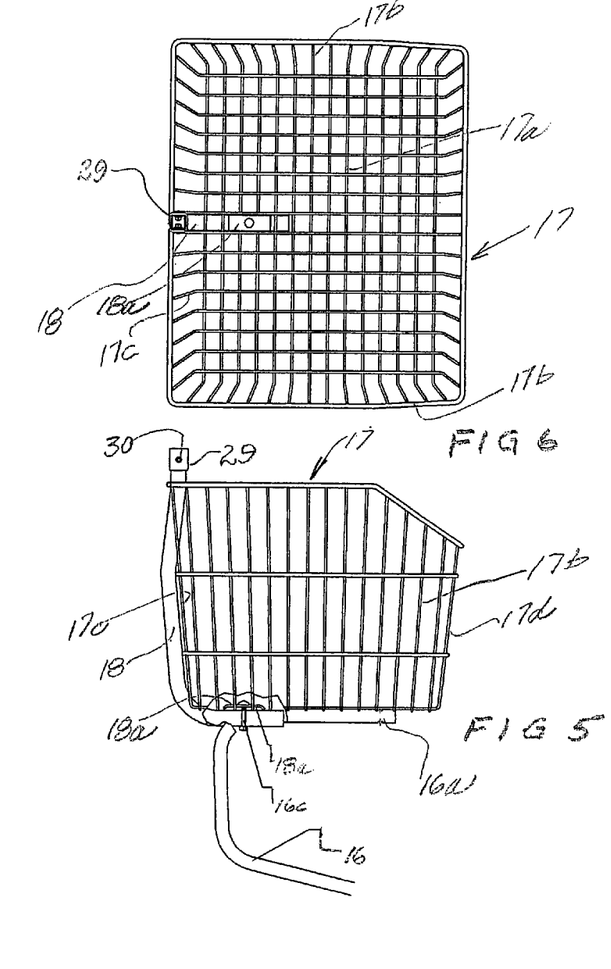
FIG. 5 is a reduced size fragmentary schematic side elevational view illustrating the basket fittings.
FIG. 6 is a top line view thereof.
Figure 7:
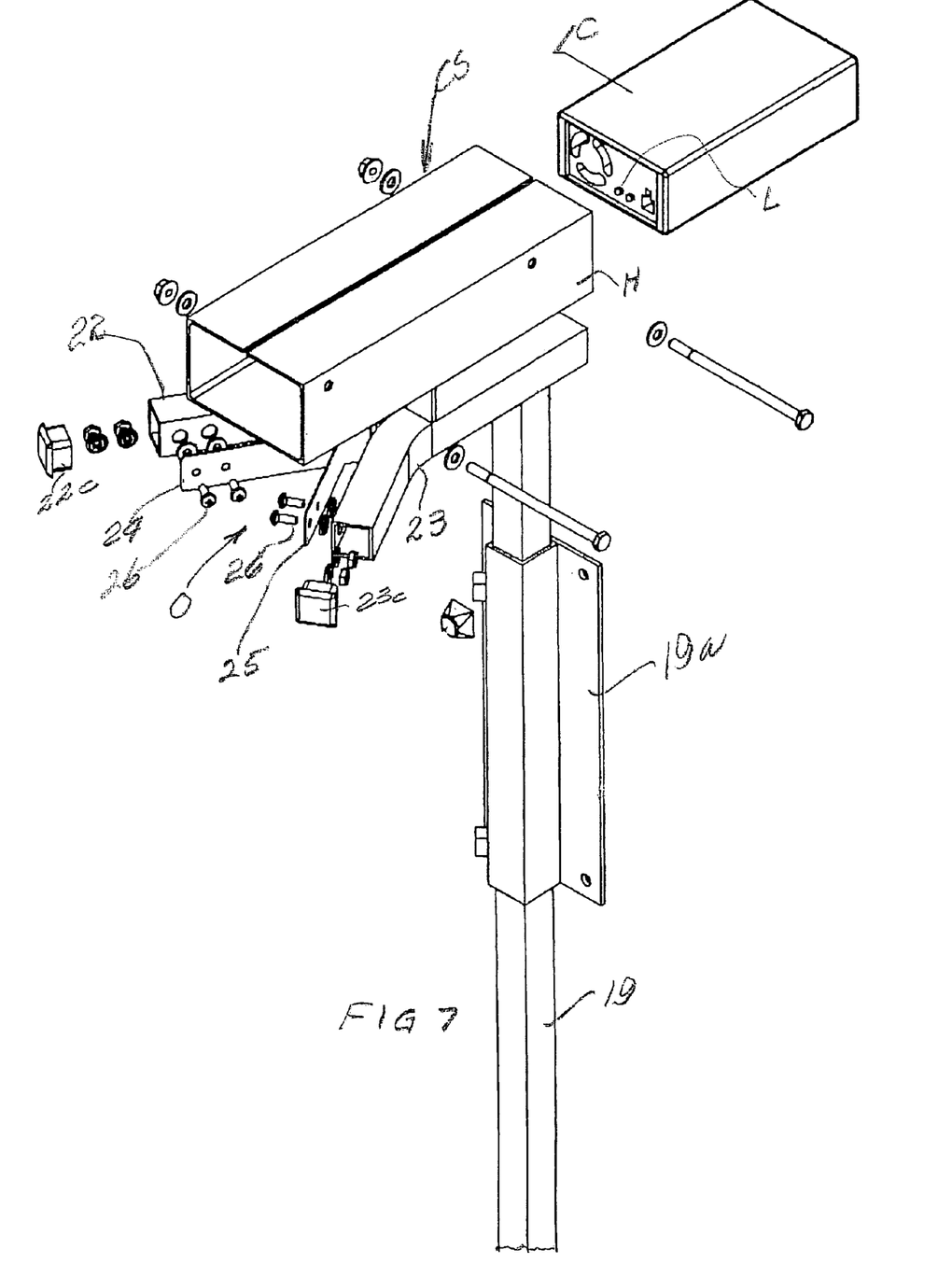
FIG. 7 is an enlarged scale, perspective elevational, exploded view of the charge station components.

Protruding from the front of the base 10 is a pair of basket support arms, generally designated 16, constituting a basket support frame and which have upper rear-turned terminal ends 16a supporting a wire basket 17. The vehicle V is of the type used in supermarkets and the like with a wire mesh basket 17 carrying groceries and other products. The basket 17, as usual, has an open top and may be constructed with a bottom wall 17a, side walls 17b, and front and rear walls 17c and 17d (FIG. 6). Mounted laterally centrally on the front of the basket 17 is a probe support tube 18, secured by a retaining bracket 18a via carriage bolts 16c to the wire mesh bottom 17e of the basket 17. The energizable upper end of the tube 18, which extends above basket 17 a predetermined distance, co-acts with a charge station generally designated CS when the vehicle V is to be recharged.

Charge station CS normally comprises a vertically disposed wire accommodating support tube 19 (FIG. 1) mounted on a wall W by a bracket 19a. Dependent from the tube 19, are wires in a cable 20a leading to a plug 20 which plugs into an AC source of power normally provided beneath the tube 19 in wall W. The tube 18 supports other elements of the charging station CS, which has an internal charging or energizing station unit or charger C including a transformer for changing the AC current supplied by the plug 20 to DC current. The internal unit or charger C is provided in a housing H which secures to the upper end of tube 19, and below the charging unit C and mounted by the tube 19, are a pair of generally horizontally projecting strip support tube elements 22 and 23 to provide a divergent guide structure in V configuration defining a piloting opening generally designated O. The rear ends of tubes 22 and 23 are connected by block 23a. Elongate angular conductive strips 24 and 25 are fixed to the interior sides of the arms 22 and 23, respectively, by screws 26.

Figure 8:
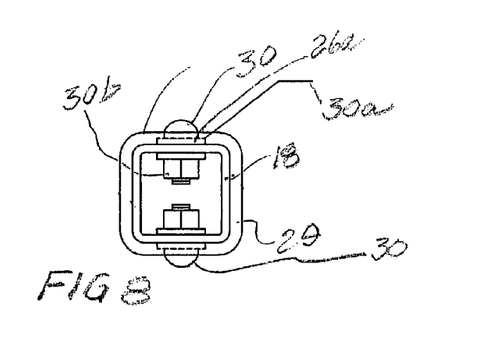
FIG. 8 is an enlarged top elevational view of the basket carried actuator element.
Figure 9:
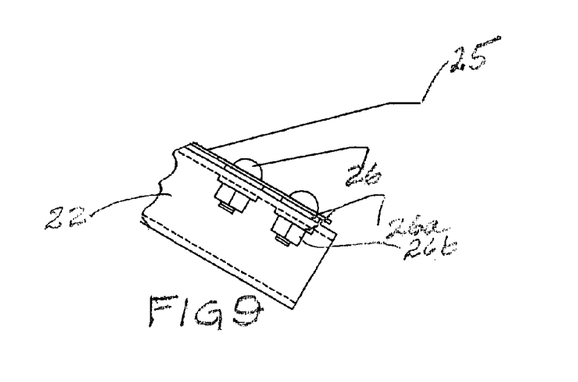
FIG. 9 is an enlarged side elevational fragmentary view of one of the charge station guide elements.

As shown in FIGS. 8 and 9, the screws 26 are part of screw and nut assemblies which include electrically insulative fiber washers 26a and nuts 26b. The pair of spaced apart exterior conductive metal, i.e. copper, resilient angular strips 24 and 25 are carried by non-conductive arms 22 and 23 to form a Y-shaped configuration (see particularly FIG. 2) and provide laterally expansible rear spring contact ends 24b and 25b. Insulative tape is applied to the sides of the leaf spring contacts 24 and 25 adjacent to tubes 22 and 23. The outer ends of the tubes 22 and 23 are closed by end caps 22c and 23c.

Figure 10:
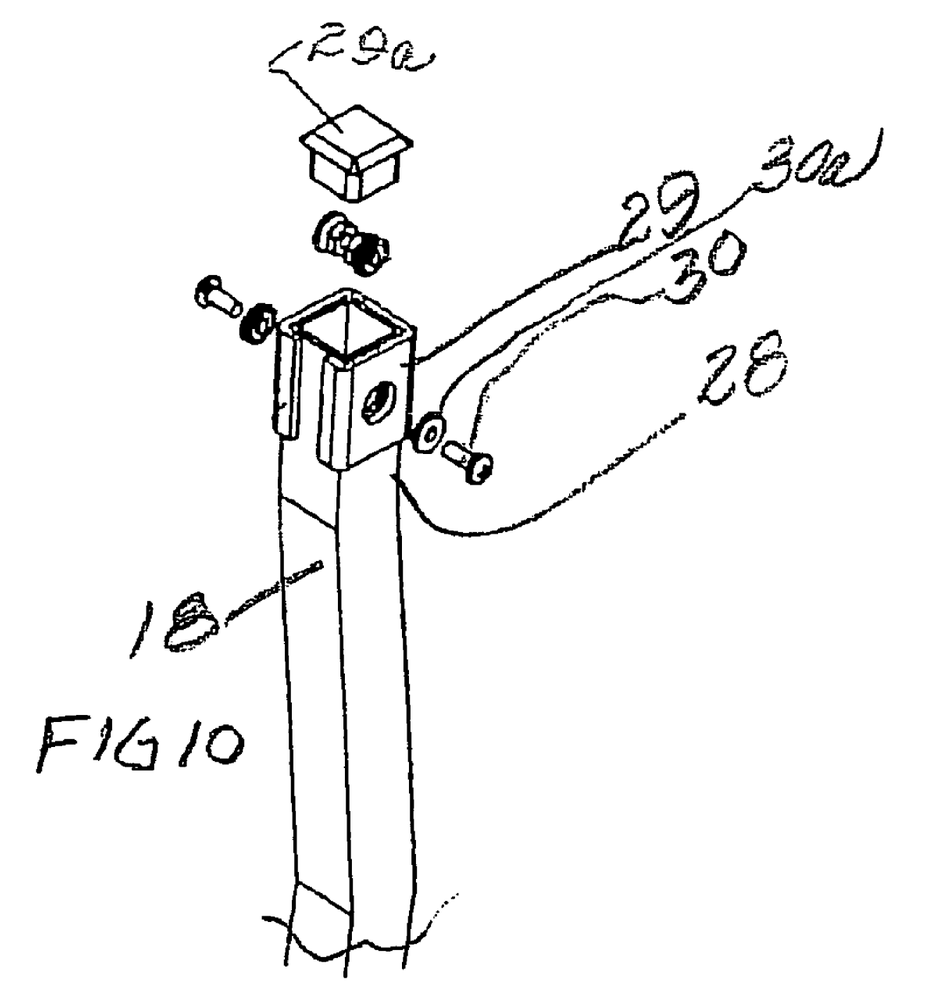
FIG. 10 is an enlarged perspective view of the upper end of the basket attached actuating energizer.

As FIG. 10 particularly indicates, the tube 18 mounted to vehicle basket 17 includes an upper end insulated sleeve 29 secured to the upper end of the tube 18 by electrically conducting screws 30 to which the wires 31 and 32 are fixed. An upper end cap 29a is provided for sleeve 29. Wires 31 and 32 run downwardly from the upper end of tube 18 and through an insulating sleeve 33 to connect to the battery system B (in this case, a pair of batteries).

Figure 2:
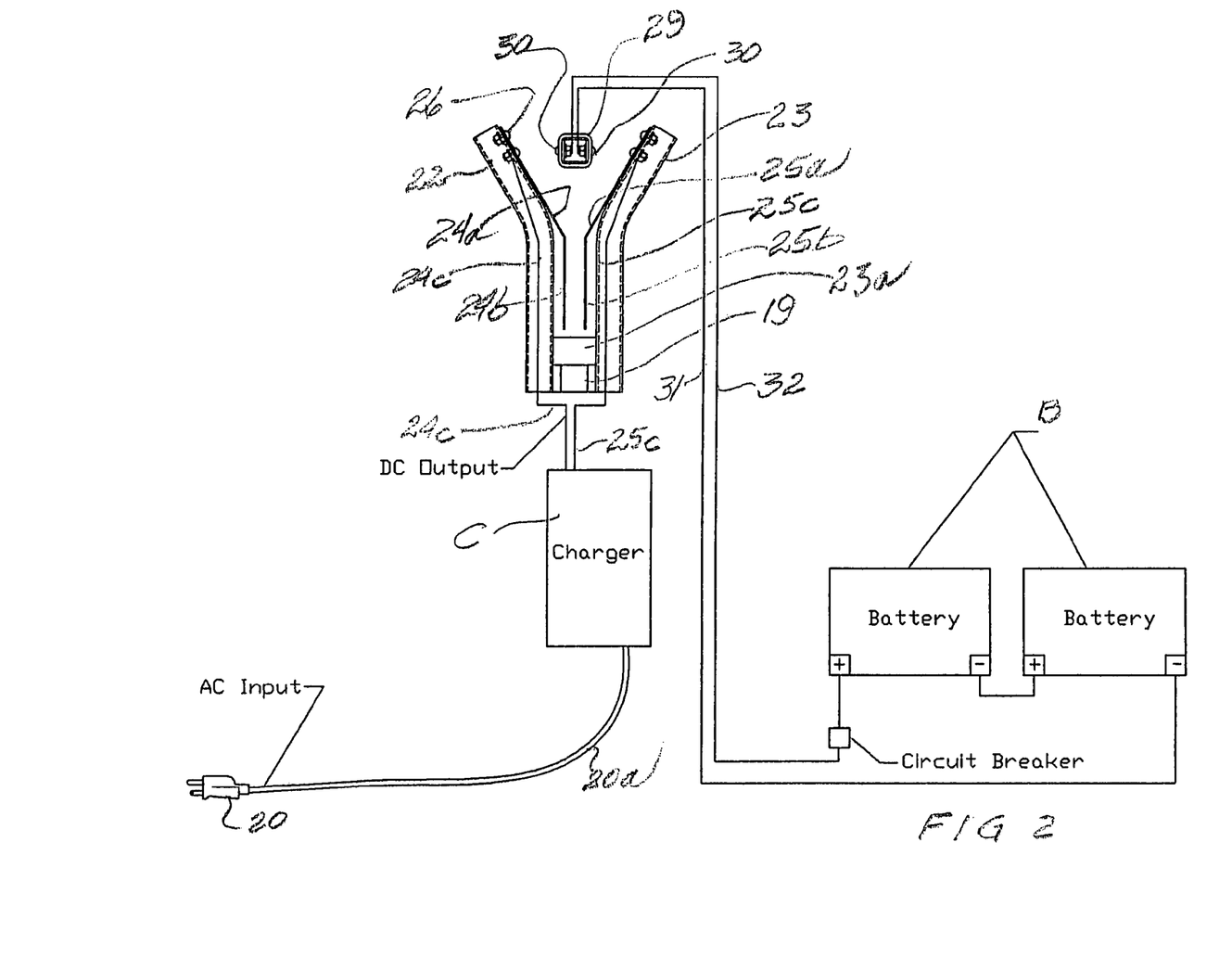
FIG. 2 is a schematic plan view illustrating the various electrical elements of a typical electrical layout.
Figures 3, 4:
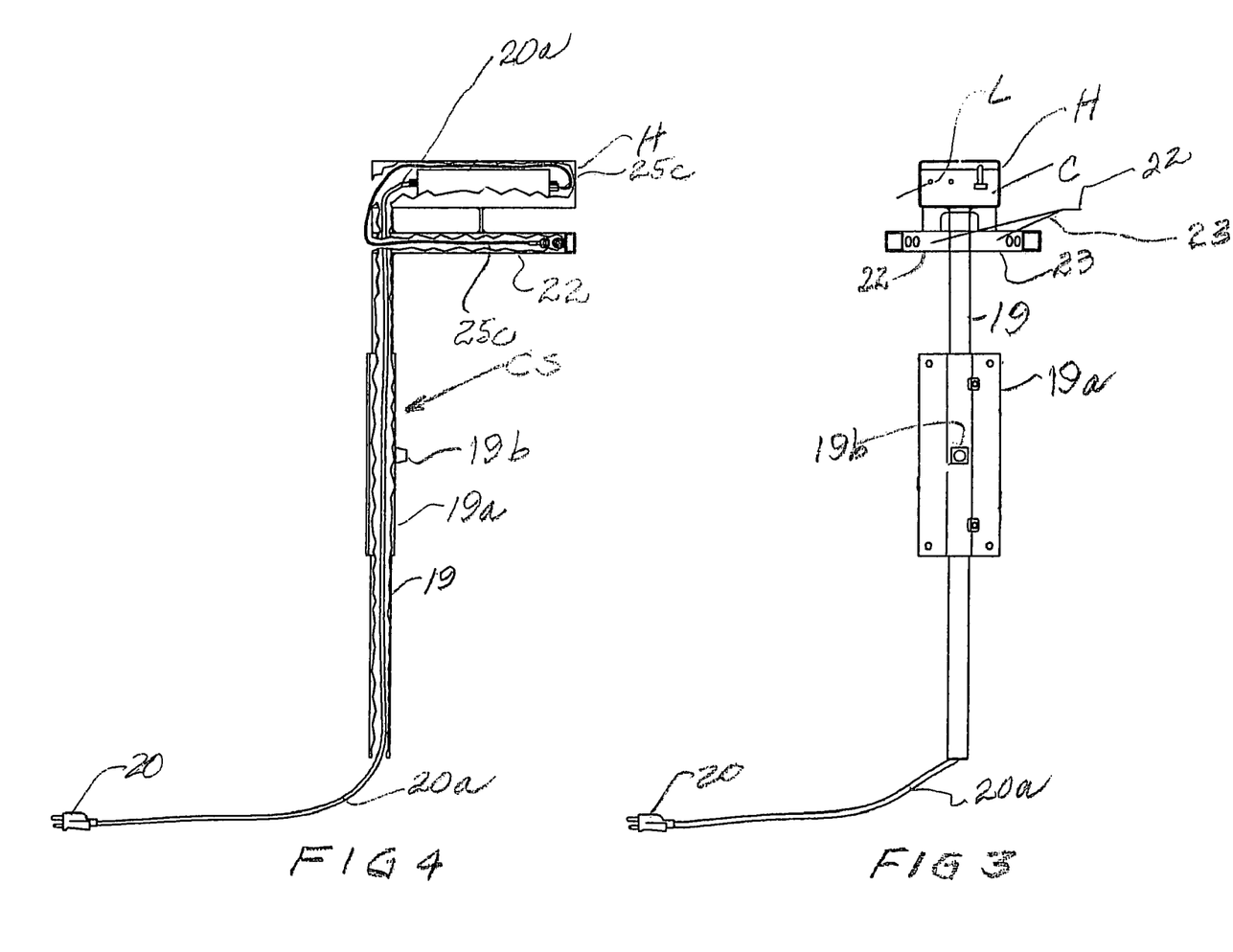
FIG. 3 is a front elevational view of the charge station components.
FIG. 4 is a cutaway side elevational view thereof.

As FIG. 2 particularly indicates, the tube 18 is insulated and it is only the screws 30 which are conductive and secured to wires 31 and 32. Insulative washers 30a are provided for the electrically conductive terminal providing screws 30 whose heads function as terminals or terminal mechanism.

In FIG. 11, a modified cart structure is disclosed in which basket 17 is considerably enlarged and the steering column 14 and seat 13 are rearwardly disposed from the pairs of steered rear driven wheels 11 and castered front wheels 12. The rear wheel seatpost 13a connects to the rear end of a rear platform 10a which is mounted on a wheel or wheels 33a on axle 33b. The platform 10a provides a pivotally connected rear extension of the platform 10 which may be releasably carried by the platform 10. The basket frame 17 rearward of the laterally central front post 18 has longitudinally extending connecting bars 35, 36, and 37 mounting on frame parts 36a and 37a. Vertical braces 38 are provided between the longitudinal bars 36 and 37 and 35 and 36, to aid in supporting the basket 17. Steering may be effected by the attachment of steering column 14 to a stationary sleeve for rear axle 11a.

Figure 12:
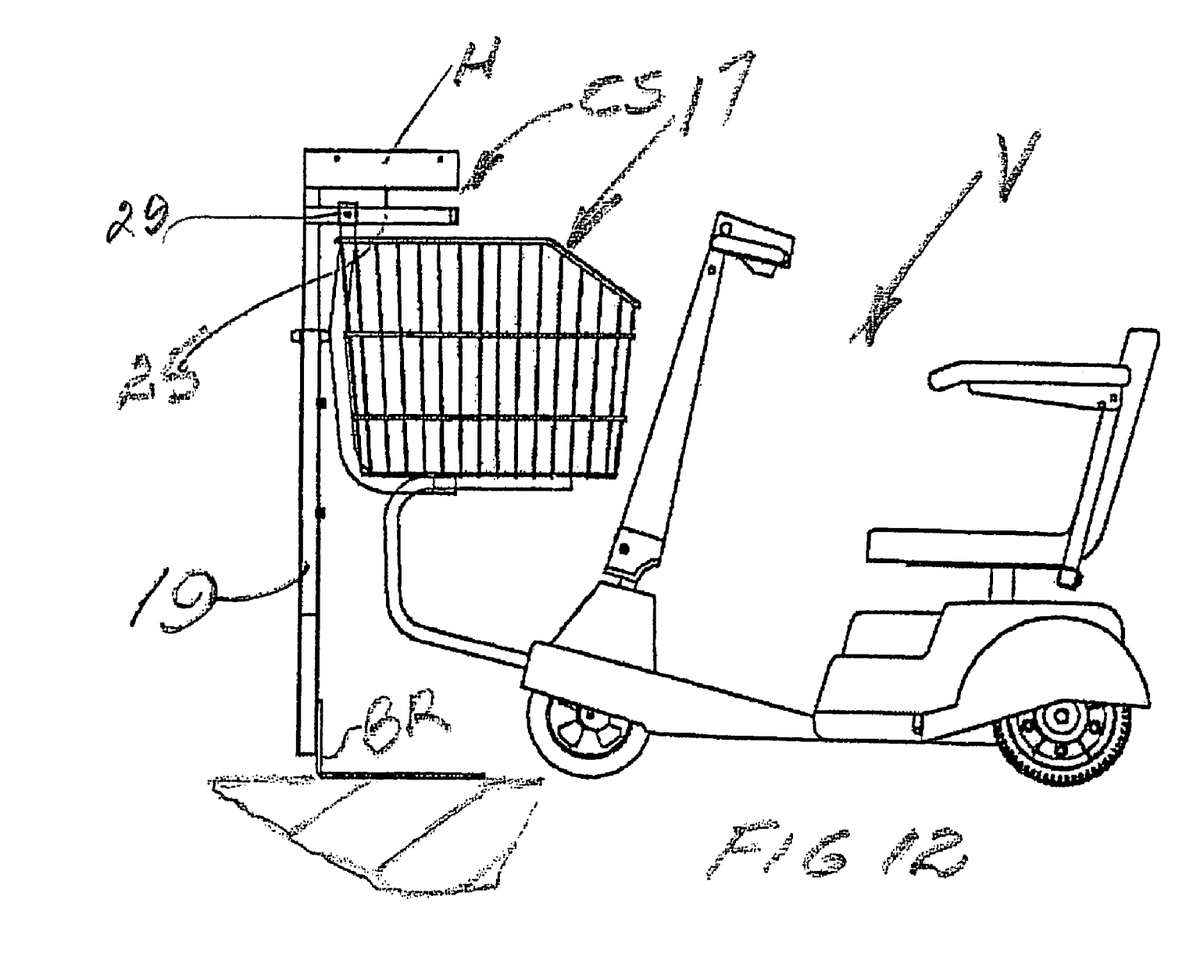
FIG. 12 is a side elevational view of the charging station illustrating another method of supporting the charging station support tube.

In FIG. 12, charge station support tube 19 is not wall supported but, rather, is supported by an angle bracket BR fixed to the floor F of the building. Otherwise, the elements are all the same.

In the operation of the embodiment disclosed in FIGS. 1–10 and 12, a physically challenged occupant of seat 13, which may have armrests 13b, uses handlebars on steering post 14 to apply a steering movement to wheel 12 and line up the longitudinally centrally disposed upper end of post 18 with the piloting opening 0 between arms 24 and 25. With fine-tuning steering adjustment, as the vehicle V continues to move forwardly, the post end 29 with its slightly projecting screws or terminals 30 is steered into the portions 24a and 25a of the conductive strips 24 and 25. In so doing, the member 29, which is of greater lateral extent, forces the spring strips 24 and 25 apart and electrical contact is made between the screws 30 on each side of tube 18 and the rear ends 24b and 25b of strips 24 and 25. The battery assembly B is accordingly automatically electrically connected with the charger unit C which is connected to the normal alternating current source via plug 20. The charger C is a conventionally structured charging unit which has charging lights L to signal when charging has been completed and the vehicle V can again be operated within the store or other area. It is a commercial charger which can be purchased from Control Solutions, Inc. of Naperville, Ill., U.S.A.

In operation, the vehicle V-1 in FIG. 11 operates in the same manner, except that steering is accomplished from a position rearwardly via steering post or column 14 and the rear wheels.

METHOD OF CONSTRUCTION

Referring particularly to FIGS. 1–12, vehicle V is normally constructed with the basket 17 in place supported by arms 16a. It is merely necessary to mount the charging station CS on wall W or to the floor via floor mounted bracket BR and affix basket mounted post 18 longitudinally centrally in position in alignment with steering post 14 when the wheel 12 is in longitudinal parallelism with the wheels 11. Wires 31 and 32 are connected to the conductive terminals or screws 30 and led down through tube 18 where they are captured by the tube 33 or a portion of deck 10 and are finally connected to the terminals of battery system B. The plug 20 is then plugged into the wall source of power. The spring strips 24 and 25 are so mounted to support tube elements 22 and 23 that the rear portions 24b and 25b are spaced apart a distance of lesser lateral width than the lateral space between the contact surfaces of terminal screws 30. Wires 24c and 25c leading through tubes 22 and 23 are connected by the screws or terminals 26 and led through tubular element 19 to the charger C. Cable 20a leading through tube 19 from charger C is then connected (plugged in) to the socket provided in charger C. One or more batteries may be categorized as a battery system.

It is to be understood that other embodiments of the invention which accomplish the same function are incorporated herein within the scope of the patent claims.

I claim:

1. In combination with a rechargeable battery carrying electrically driven cart of the type usable by physically challenged persons and having a front and rear end and having a steering post mounted shopping basket or other article
   receiving compartment at it's front end ahead of a cart seat:
   a. a direct current transmitting first member mounted to extend substantially laterally centrally upwardly from said basket or compartment;
   b. a charging station incorporating a second direct current transmitting member and including a support for said charging station;
   c. one of said first and second member comprising a probe and the other a probe receiver having a probe capturing system including at least a pair of electrically conductive elements forming a passageway for receiving said probe, and including at least one electrically conductive laterally expandable resilient strip part the other one of said probe and probe receiver carrying laterally external terminal mechanism for electrically engaging and laterally expanding said strip part; and
   d. electrical conductor connections to be attached between said batteries and one of said members and between said other of said members and a source of direct current electrical power.

2. The combination of claim 1 in which said probe capturing system includes nonconductive convergent strip support elements and a pair of generally horizontally extending parallel spaced apart resilient angular opposed strip elements in compositely Y configuration having end portions spaced laterally from said strip support elements and which are laterally outwardly expansible to snugly capture said probe when said probe and probe receiver are in electrically engaged operative position.

3. The combination of claim 2 wherein said strips are elongate angular strips with said leg portions spaced laterally from said strip support elements on said converging system to be laterally outwardly expandable.

4. The combination of claim 3 in which said probe comprises a vertically extending probe tube mounted laterally centrally to the front end of said basket and extending a predetermined distance above said basket, said tube at its upper end having laterally protruding contacts constituting said terminal mechanism spaced apart a greater distance than said leg portions of said strips, said connections to said battery including electrical wire conductors insulatively connecting to said contacts and leading down through said probe tube.

5. The combination of claim 4 in which said probe receiver system includes a vertically extending station tube having an upper end mounting said strip support elements, said connections between said probe receiver to a source of power run through said station tube to said charging station and through said tube to said source of power, said charging station incorporating a system for changing AC current to DC current.

6. The method of claim 5 comprising, providing said forwardly converging system as a pair of convergent support tubes with electrically conductive resilient angular metal strips supported in forwardly inverse Y configuration at the level of said probe terminal mechanism, said strips including linear rear leg portions spaced laterally apart and laterally from said support tubes to be laterally outwardly expandable when said probe enters the area between them.

7. A method of charging the battery system carried by an electrically forwardly and rearwardly driven cart of the type usable by physically challenged persons and including a steering post in alignment with a seat behind said post and a shopping basket centrally mounted in alignment with said steerable post and seat to enable steering of said cart by a seated person; said cart being used in company with a vehicle charging system comprising a probe carried forwardly on the shopping basket and having a probe conductor element at the front end of the shopping basket extending above the shopping basket; a probe receiver including a support for said charging station and incorporating a probe capturing system comprising a longitudinally extending resilient strip parts assembly with electrically conductive strip part portions, at least one of which is mounted to be resiliently laterally expansible, and said probe conductor element comprising D.C. terminal mechanism for electrically engaging between and laterally expanding said assembly, and wherein there are D.C. electrical conductor connections between said battery system and probe terminal mechanism, and said probe receiver conductor portions and a source of electrical power, comprising:
 a. driving said cart forwardly in a direction to move said D.C. probe terminal mechanism into said strip part assembly, and
 b. further moving said cart forwardly to bring said terminal mechanism on said probe into engagement with said electrically conductive strip assembly and forcing said strip part portions resiliently apart sufficiently to maintain appropriate electrical contact to permit uninterrupted recharging to occur.

8. The method of claim 7 wherein upon recharging being completed, said cart is backed in a linear path from between said strip parts.

9. A vehicle battery charging station system for an electrically powered battery powered steerable scootertype vehicle for the physically challenged having at least one rechargeable battery, a shopping basket at its front end, and a direct current probe adapted to be carried forwardly on said shopping basket, said vehicle probe having external electrical direct current transmitting terminal mechanism, comprising;
 a. a probe receiver adapted to receive and transmit direct current including a support for a charging station having a recharger for converting alternating current to direct current;
 b. direct current electrically conductive connections attached between said probe receiver and said recharger; and
 c. a probe capturing system including a non-conductive support carrying opposing electrically conductive strips forming a passageway for said probe which is at least partly narrower laterally than said vehicle probe, at least one electrically conductive strip being a resilient, laterally expandable strip part spaced from said non-conductive supports and adapted to be supported at the level of said vehicle probe.

10. The station system of claim 9 in which said strips have horizontally extending generally parallel resilient strip parts extending planarly.

11. The station system of claim 10 wherein said probe capturing system comprises convergent strip support tubes and said strips are both conductive, elongate angular resilient strips forming a converging Y configuration in assembly mounted on said convergent strip support tubes.

12. The station system of claim 11 in which said strips have electrically conductive linear rear leg portions spaced apart laterally and spaced laterally from said rear portions of said strip support tubes to be laterally outwardly expandable when said vehicle probe enters said space between said leg portions.

13. The station system of claim 12 in which said station probe comprises a vertically upwardly extending vehicle probe tube adapted to be mounted laterally centrally to the front end of said basket, said vehicle probe tube at its upper end having laterally protruding direct current transmitting contacts constituting said terminal mechanism, said connections to said batteries including wires connecting to said contacts and leading down through said vehicle probe tube.

14. The station system of claim 13 in which said probe receiver support comprises a vertically extending station tube having an upper end mounting said convergent strip support tubes, said connections between said probe receiver to
 a source of power running through said station tube to said charging station and
 through said station tube to said recharger to be connected to source of power.

15. The station system of claim 14 in which said station tube is adapted to be wall mounted or floor mounted.

16. A method of constructing a system for charging at least one rechargeable battery carried by an electrically driven cart usable by physically challenged persons and including a steering post member with a forward shopping basket system and a seat behind said basket system in position to be aligned substantially front to rear with said steering post member and basket system, comprising:
 a. mounting a probe on said basket system laterally centrally in a fore to aft direction, and providing external direct current transmitting probe terminal mechanism thereon for operation at a predetermined level above said basket system or compartment;

b. providing a probe receiver connectable with a charging station;

c. providing a probe capturing system on said receiver including mechanism forming a probe capturing passageway and including a pair of electrically separated conductive elements for transforming direct current to said probe terminal mechanism supported generally at the level of said probe terminal mechanism; and d. providing electrical connections for installation between said battery and probe terminal mechanism, and between said probe receiver part and a source of direct current electrical power.

17. The method of claim 16 comprising, providing said probe capturing system as a pair of non-conductive convergent support tubes with electrically conductive resilient angular metal strips supported in forwardly inverse Y configuration compositely at the level of said probe terminal mechanism, said strips including electrically conductive linear rear leg portions spaced laterally apart a distance greater than said probe terminals and spaced laterally from said support tubes to be laterally outwardly expandable when said probe enters said passageway between them.

18. The method of claim 16 wherein said probe is provided as a vertically extending tube mounted laterally centrally to the front end of said basket, and having at its upper end insulated laterally protruding external contacts constituting said terminal mechanism with lateral outer surfaces spaced apart a greater distance than said rear leg portions of said strips for engaging said conductor strips and effectively spreading them to maintain a positively engaged position with relation to said strips, and providing said connection to said battery as wires connecting to said contacts and leading downwardly through said tube to said battery.

* * * * *